United States Patent [19]
Griffith et al.

[11] Patent Number: 5,689,674
[45] Date of Patent: Nov. 18, 1997

[54] METHOD AND APPARATUS FOR BINDING INSTRUCTIONS TO DISPATCH PORTS OF A RESERVATION STATION

[75] Inventors: James S. Griffith, Aloha; Shantanu R. Gupta, Beaverton; Glenn J. Hinton, Portland, all of Oreg.

[73] Assignee: Intel Corporation, Santa Clara, Calif.

[21] Appl. No.: 550,745

[22] Filed: Oct. 31, 1995

[51] Int. Cl.[6] .................................................. G06F 9/30
[52] U.S. Cl. .................... 395/393; 395/390; 395/391; 395/672; 395/674; 395/675
[58] Field of Search ............................ 395/375, 650, 395/800, 390, 391, 393, 672, 674, 675

[56] References Cited

U.S. PATENT DOCUMENTS

| | | | |
|---|---|---|---|
| 4,807,115 | 2/1989 | Torng | 395/375 |
| 5,031,096 | 7/1991 | Jen et al. | 395/496 |
| 5,185,868 | 2/1993 | Tran | 395/393 |
| 5,202,993 | 4/1993 | Tarsy et al. | 395/705 |
| 5,430,851 | 7/1995 | Hirata et al. | 395/388 |
| 5,519,864 | 5/1996 | Martell et al. | 395/650 |
| 5,553,256 | 9/1996 | Fetterman et al. | 395/375 |

OTHER PUBLICATIONS

Johnson, Mike, "Superscalar Microprocessor Design", Prentice-Hall, Inc., Englewood Cliffs, N.J., 1991, pp. i–xxiv, Chapters 3(pp. 31–55) and 7(pp. 127–146).

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Primary Examiner*—Kenneth S. Kim
*Attorney, Agent, or Firm*—Blakely, Sokoloff, Taylor & Zafman

[57] ABSTRACT

A method and apparatus for binding instructions to dispatch ports in a reservation station includes a counter mechanism and a port identifier. The counter mechanism maintains a count of instructions which are pending dispatch from at least one of the dispatch ports. The port identifier receives an instruction and identifies to which of the dispatch ports the instruction is to be bound, based on the count of instructions maintained by the counter mechanism.

22 Claims, 6 Drawing Sheets

METHOD AND APPARATUS FOR BINDING INSTRUCTIONS TO DISPATCH PORTS OF A RESERVATION STATION

BACKGROUND OF THE INVENTION

1. Field of the Invention

The present invention pertains to the field of microprocessor architecture. More particularly, this invention relates to identifying a dispatch port of a reservation station from which an instruction is to be dispatched.

2. Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

Given the large number of transistors involved, modern microprocessors are divided into discrete functional blocks through which instructions are propagated one stage at a time. This allows for pipelining of instructions such that when one instruction has completed the first stage of processing and moves on to the second stage, a second instruction can begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

Substantial increases in instruction throughput are achievable by implementing out-of-order dispatch of instructions to the execution units of superscalar microprocessors. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design* and Prentice-Hall, Inc., 1991, Chapters 3 and 7.

In many microprocessors implementing reservation stations, including superscalar processors, instructions are dispatched from the reservation station via multiple dispatch ports. Instructions can be separated into two classifications: those instructions which can be dispatched from a particular one of the multiple dispatch ports, and those instructions which can be dispatched from more than one of the multiple dispatch ports. Identifying which of the multiple dispatch ports an instruction is to be dispatched from is an important part of the execution pipeline, as delays in performing the identification or incorrect identifications can result in reduced processor performance. Thus, it would be beneficial to provide a mechanism which accurately and quickly identifies from which of multiple dispatch ports an instruction is to be dispatched.

Additionally, for those instructions which can be dispatched from more than one of the multiple dispatch ports, situations can arise where one of the dispatch ports is used more heavily than another. This situation can result in unnecessarily delaying instruction execution due to the instructions waiting for a more heavily utilized dispatch port. Thus, it would be beneficial to provide a mechanism that identifies which of multiple dispatch ports an instruction is to be dispatched from when the instruction can be dispatched from more than one of the dispatch ports, while at the same time maintaining efficient utilization of the dispatch ports.

As will be described in more detail below, the present invention provides for a dispatch port binding mechanism that achieves these and other desired results which will be apparent to those skilled in the art from the description to follow.

SUMMARY OF THE INVENTION

A method and apparatus for binding instructions to dispatch ports of a reservation station is described herein. The apparatus includes a counter mechanism and a port identifier. The counter mechanism maintains a count of instructions which are pending dispatch from at least one of the dispatch ports. The port identifier receives an instruction and identifies to which of the dispatch ports the instruction is to be bound, based on the count of instructions maintained by the counter mechanism.

In one embodiment of the present invention, the counter mechanism and the port identifier are contained in an allocator, and the allocator is coupled to a reservation station. The reservation station buffers instructions and dispatches instructions from the dispatch ports the instructions are bound to, as identified by the port identifier.

In one embodiment of the present invention, an instruction could be dispatched over multiple dispatch ports. The present invention maintains a count of instructions which are pending dispatch from each of these multiple dispatch ports, and determines the dispatch port to which the instruction is to be bound based on a comparison of these counts.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

Figure 1:
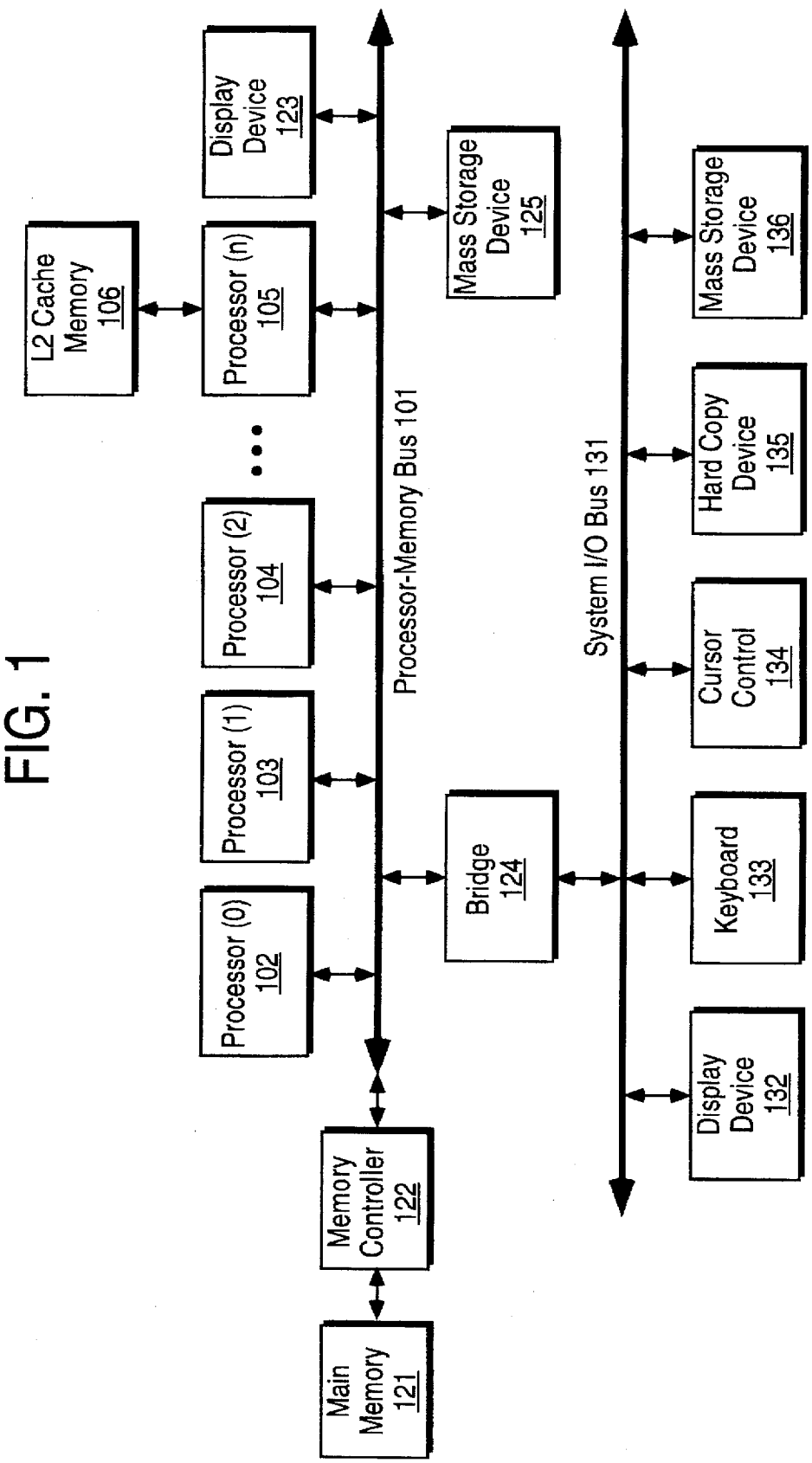
FIG. 1 shows an overview of an example multiprocessor computer system such as may be used with one embodiment of the present invention.

FIG. 1 shows an overview of an example multiprocessor computer system such as may be used with one embodiment of the present invention. The computer system generally comprises a processor-memory bus or other communication means 101 for communicating information between one or more processors 102, 103, 104 and 105. The processor-memory bus 101 includes arbitration, address, data and control buses (not shown). In one embodiment, the processors 102 through 105 each includes a small, extremely fast internal cache memory (not shown), commonly referred to as a level one (L1) cache memory for temporarily storing data and instructions on-chip. In addition, a bigger, slower level two (L2) cache memory 106 can be coupled to any of the processors, such as processor 105, for temporarily storing data and instructions for use by the processor. Each processor may have its own, optional L2 cache, or some may share an L2 cache.

Processors 102, 103, and 104 may each be a parallel processor (a symmetric co-processor), such as a processor similar to or the same as processor 105. Alternatively, processors 102, 103, or 104 may be an asymmetric co-processor, such as a digital signal processor. In addition, processors 102 through 105 may be heterogeneous.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In certain implementations of the present invention, additional processors or other components or buses may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

In one embodiment, the present invention is implemented in a microprocessor that executes the well-known Intel Architecture Microprocessor instruction set, such as the Intel Pentium Pro™ processor. The present invention may, however, be implemented in any microprocessor architecture in which a reservation station having multiple dispatch ports is utilized for storing instructions. A variety of microprocessors may take advantage of the present invention whether those microprocessors occupy a single chip or more than one chip and regardless of the materials used to fabricate the chip including silicon or gallium arsenide.

In one embodiment, a microprocessor using the present invention, prior to executing Intel Architecture Microprocessor instructions, decodes them into a more simple, stylized sequence of "micro operations." The micro operations are then analyzed and scheduled according to resolved dependencies thus implementing out-of-order execution.

Figure 2:
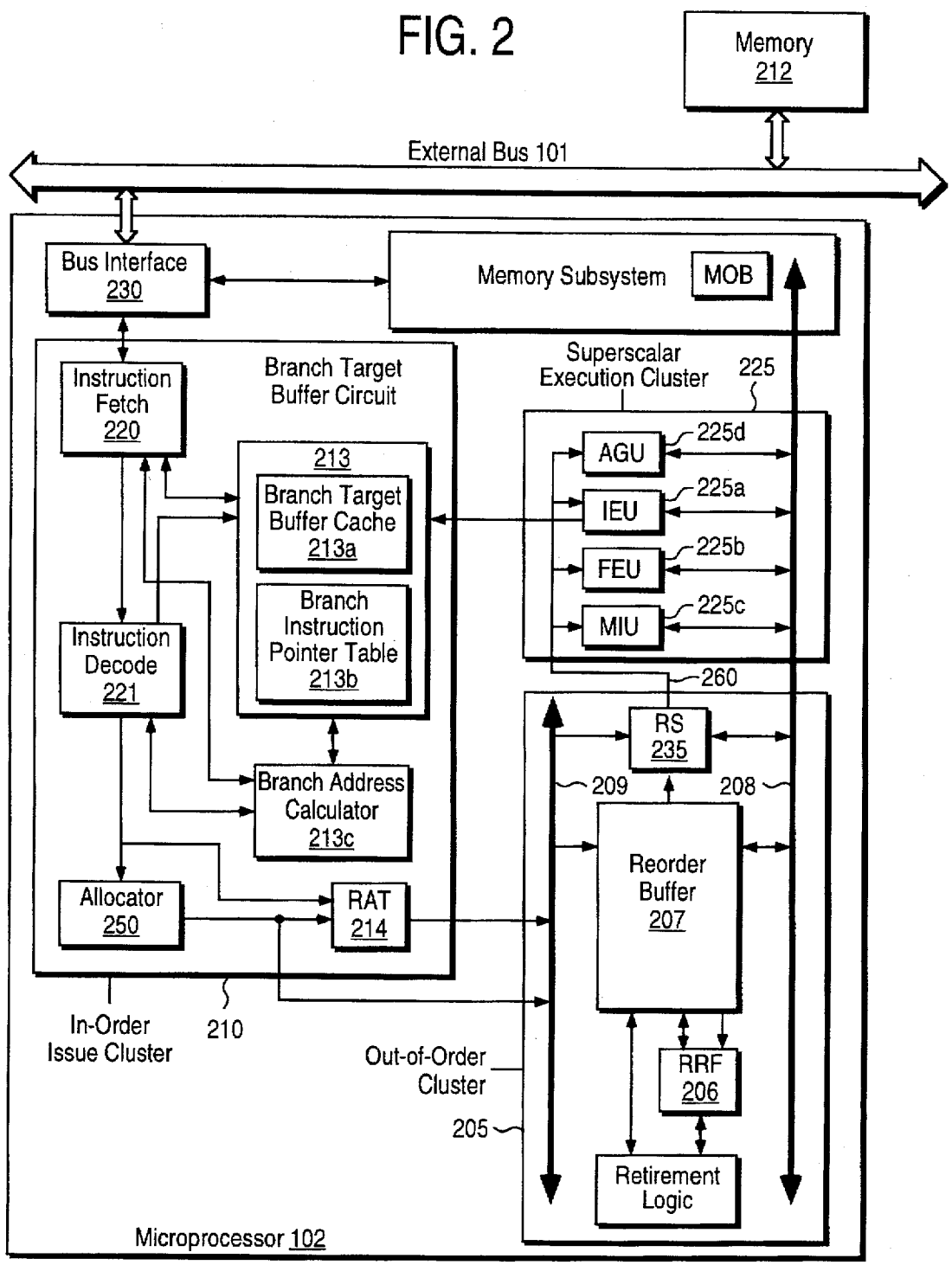
FIG. 2 illustrates a general block diagram of a processor such as may be used with one embodiment of the present invention.

FIG. 2 illustrates a general block diagram of a processor 102 such as may be used with one embodiment of the present invention. The components of the processor 102 are shown in FIG. 2 to provide the general structure and interface of the processor of the present invention. Generally, processor 102 is composed of an in-order portion 210 and an out-of-order portion 205 as shown. The branch target buffer (BTB) circuit 213, BTB cache 213a, branch instruction pointer 213b and the branch address calculator 213c perform speculative instruction execution by predicting program branch results to provide the pipeline with a steady source of instructions. The register alias table (RAT)

214 performs register renaming and is the last stage of the in-order pipeline and subsequent to this stage instructions and association information are placed into the reservation station (RS)235. Instructions that have been executed and are flowing from the out-of-order portion 205 retire to the real register file (RRF) 206 in program code order if they are determined to be part of a properly predicted program pathway. The reorder buffer (ROB) 207 contains information that may be part of a speculatively predicted branch. The out-of-order cluster 205 schedules operations for execution to the execution cluster 225, receives the results from the computations, and eventually updates the architecturally visible RRF 206 with these results, assuming the computations are part of a properly predicted branch.

An external address and data bus 101, a writeback bus 208, a dispatch bus 260, and an internal bus 209 are also illustrated. The writeback bus 208 carries results of computations from the execution cluster 225 to the reorder buffer 207 which holds the results unit retirement. Dispatch bus 260 carries information relating to instructions dispatched from the reservation station to be executed within the execution cluster 225. Memory 212 (which may be, for example, memory 121 of FIG. 1) for containing instruction and data information is coupled to bus 101 which is coupled to a bus interface unit 230.

The processor of FIG. 2 comprises instruction fetch 220 and decode 221 units with an integrated instruction cache (not shown). These instruction issue units are coupled to the bus interface 230 to receive instructions and data. The bus interface 230 is also coupled to a data cache memory (not shown). The instruction issue units (e.g., fetch and decode) are coupled to an allocator 250 which allocates entries of resource buffers, including the reorder buffer 207 and the reservation station 235. The entries of the reorder buffer 207 become vacant at the time of retirement and the entries of the reservation station become vacant at the time of dispatch. The allocator 250 and the instruction issue units are coupled to the reservation station 235 and are also coupled to the RAT 214, which performs register renaming. The RAT 214 is coupled, via internal bus 209, to provide the reservation station 235 with instruction information for subsequent execution. The reservation station 235 is coupled to supply dispatched instruction information to the execution cluster 225, which includes an integer unit (IEU) 225a, a floating point unit (FEU) 225b, a memory unit (MIU) 225c, and an address generation unit (AGU) 225d.

The execution cluster 225 of the processor 102 includes execution units that execute the integer and floating point instructions when their operand dependencies on execution results of preceding instructions are resolved, including those integer and floating point instructions that are speculatively fetched and issued. Similarly, the execution cluster 225 also includes a memory execution unit that executes and dispatches load and store instructions to a data cache memory as soon as their operand dependencies on execution results of preceding instructions are resolved, including those load and store instructions that are speculatively fetched and issued.

The AGU 225d, IEU 225a, FEU 225b, and MIU 225c are all coupled to reservation station 235 via a dispatch bus 260. They are also coupled to writeback bus 208. RS 235 is coupled to the writeback bus 208 and the internal bus 209. The RS 235 is also coupled to ROB 207 and RRF 206. ROB 207 and RRF 206 are also coupled to the internal bus 209 and the writeback bus 208. Together, the above are coupled to hold, dispatch, execute and commit execution results of instructions. The instructions may be dispatched and executed out-of-order. Execution core 225 may include multiple IEUs, such as two, and multiple FEUs, such as two.

In operation, the instruction issue units 220 and 221 fetch instructions from an external memory, such as memory unit 212, through the bus interface 230 via bus 101. The fetched instructions are stored in an instruction cache (not shown). The bus interface 230 manages transfers of data between external components and the processor 102. In addition, it manages cache coherency transfers. The instruction issue units issue several instructions within a given clock cycle in program code order to the register alias table 214 and the allocator 250.

The allocator 250 according to one embodiment of the present invention interrogates a deallocation vector (generated by the reservation station 235) for vacant entries and from this vector assigns the issued instructions a vacant entry of the reservation station 235 for each micro operation. In one implementation, this interrogation of the deallocation vector to locate the vacant entries of the RS 235 is accomplished very rapidly, and not slower than one clock cycle. The allocator 250 also assigns each incoming micro operation to a vacant location (entry) in the reorder buffer 207, thereby mapping the logical destination address (LDST) of the micro operation to a corresponding physical destination address (Pdst) in the ROB 207. The register alias table 214 maintains this mapping for the most recently renamed logical destination registers. By renaming the registers used by the instructions to a larger set of physical registers that reside in the ROB 207, false data dependencies between instructions may be removed allowing additional parallel execution of instructions.

The out-of-order cluster 205 schedules the instructions for execution depending on data availability and other constraints. When the source data becomes available and an execution unit becomes free, an associated instruction within the reservation station 235 becomes eligible for dispatch to the execution cluster 225. The execution cluster 225 performs arithmetic and logic operations, such functions as add, subtract, logical AND, and integer multiply, as well as memory operations and returns the data to the out-of-order cluster 205. Some instructions are fetched and issued speculatively. The instruction issue units may issue a multiple number of instructions (e.g., 1, 2, or 3) within a common clock cycle. Result data is then stored in the ROB 207.

The contents of a ROB register are retired to a location in a real register file 206 in program code order when the register becomes part of a properly predicted program pathway. The ROB 207 maintains this program code order because the ROB 207 was filled by the in-order cluster 210. Since both the RRF 206 and the ROB 207 can be a source for operand data, the RAT 214 stores a real register file valid bit (RRFV) that indicates whether the value indicated by the logical address is to be found at the physical address in the ROB 207 or in the RRF 206 after retirement. Based upon this mapping, the RAT 214 also associates every logical source address to a corresponding location in the ROB 207 or the RRF 206 (the source operand of one instruction generally must have been the destination of a previous instruction).

Reservation station 235 receives and stores information pertaining to the issued instructions that are pending execution and resolves their operands with data from the IEU 225a, the FEU 225b, the data cache memory (not shown), the ROB 207 and RRF 206 and holds them until their operands are all resolved. The RS 235 then dispatches the issued instructions to the AGU 225d, the IEU 225a, the FEU 225b and the MIU 225c as appropriate. Each incoming micro operation is also assigned and written into an entry in the reservation station 235 by the allocator 250. The reservation station 235 assembles the instructions awaiting execution by an appropriate execution unit, such as integer execution unit. The use of register renaming in the ROB 207 not only avoids register resource dependencies to permit out-of-order execution, but also plays a role in speculative execution since the ROB 207 contains only speculative data. If an instruction sequence is considered to be part of a predicted branch, then the execution of those instructions using the renamed registers in the ROB 207 has no effect on the actual registers denoted by the instruction. Thus, if it is determined that the branch was mispredicted, the results calculated and stored in the ROB 207 may be erased and the pipeline flushed without affecting the actual registers found in the register file 206. If the predicted branch affected the values in the RRF 206, then it would be difficult to recover from branch misprediction because it would be difficult to determine the values stored in the registers before the predicted branch was taken without the use of redundant registers in the ROB 207.

After execution within one of the execution units, when a result is produced, it is written to the ROB 207. The result may provide an input operand to one or more waiting instructions buffered in the reservation station 235, indicating that the source operand is ready for dispatch to one or more execution units along with the instructions using the operand. In the general case, instruction information held within the reservation station 235 will source the ROB 207 to obtain operand data and this information is forwarded to the appropriate execution units for execution when an instruction is scheduled and dispatched. When the checking logic of the processor determines that a particular instruction is associated with a properly predicted branch, and all other conditions are satisfied, an instruction that has been executed and placed into the ROB 207 may retire. The associated physical register (Pdst) of that retiring instruction is then written into the RRF 206 and becomes architecturally visible. The IEU, FEU, and the MIU in turn perform their operations accordingly. The execution results of the integer, floating point and load instructions are held in the ROB 207, and then committed to the RRF 206 in strict von Neumann order. Speculative execution results of the mispredicted branches are not committed, but instead are held in the ROB 207 and deallocated upon their retirement.

Regarding the structure of the present invention processor 102, the following terminology describes the relevant processing stages of the instructions. The Issue stage refers to the merging of the in-order stream of instructions from the issue cluster with the corresponding source data which is provided by the ROB 207 and then placing this information into the reservation station 235. A set of three, or fewer, instructions are issued within a common clock cycle. Within the issue stage, registers used by the instruction are renamed to registers within the ROB 207 and this renaming occurs within the RAT 214. At the Issue stage, instructions may be part of a speculative program path as a result of a branch prediction.

Also at the Issue stage, instruction information is allocated during two Allocation stages that make up a two cycle allocation pipeline (the allocation is actually performed in one cycle, but it is staggered across two clock cycles). During Allocation (e.g., during a given or current allocation cycle), the allocator 250 determines which entries of the reservation station are vacant (e.g., which ones were dispatched previously) and assigns these vacant entries to the set of newly issued instructions. The two pipestage implementation determines which entries are vacant during a current stage (n) and assigns them to micro operations received at the next subsequent stage (n+1).

The Ready/Schedule stage identifies all the instructions ready to execute (Ready stage) that are pending in the RS 235 and selects (Schedules) a group (e.g., by FIFO or similar process) for execution and also schedules an execution unit. For a given clock cycle, not all instructions that are ready may be scheduled. At Dispatch, the scheduled instructions are forwarded to a selected execution (functional) unit. At Writeback, the results generated by the functional units are written into appropriate entries of the ROB 207. Also, the writeback ports are examined for results that are sources of instructions pending in the RS 235 so that the data-ready status of these pending instructions may be updated. At Retirement, the results from the ROB 207 that pertain to instructions that are properly predicted and also executed and placed into an architecturally visible buffer (RRF 206) in their original issued order. Upon misprediction, the speculative data in the ROB 207 is cleared.

Figure 3:
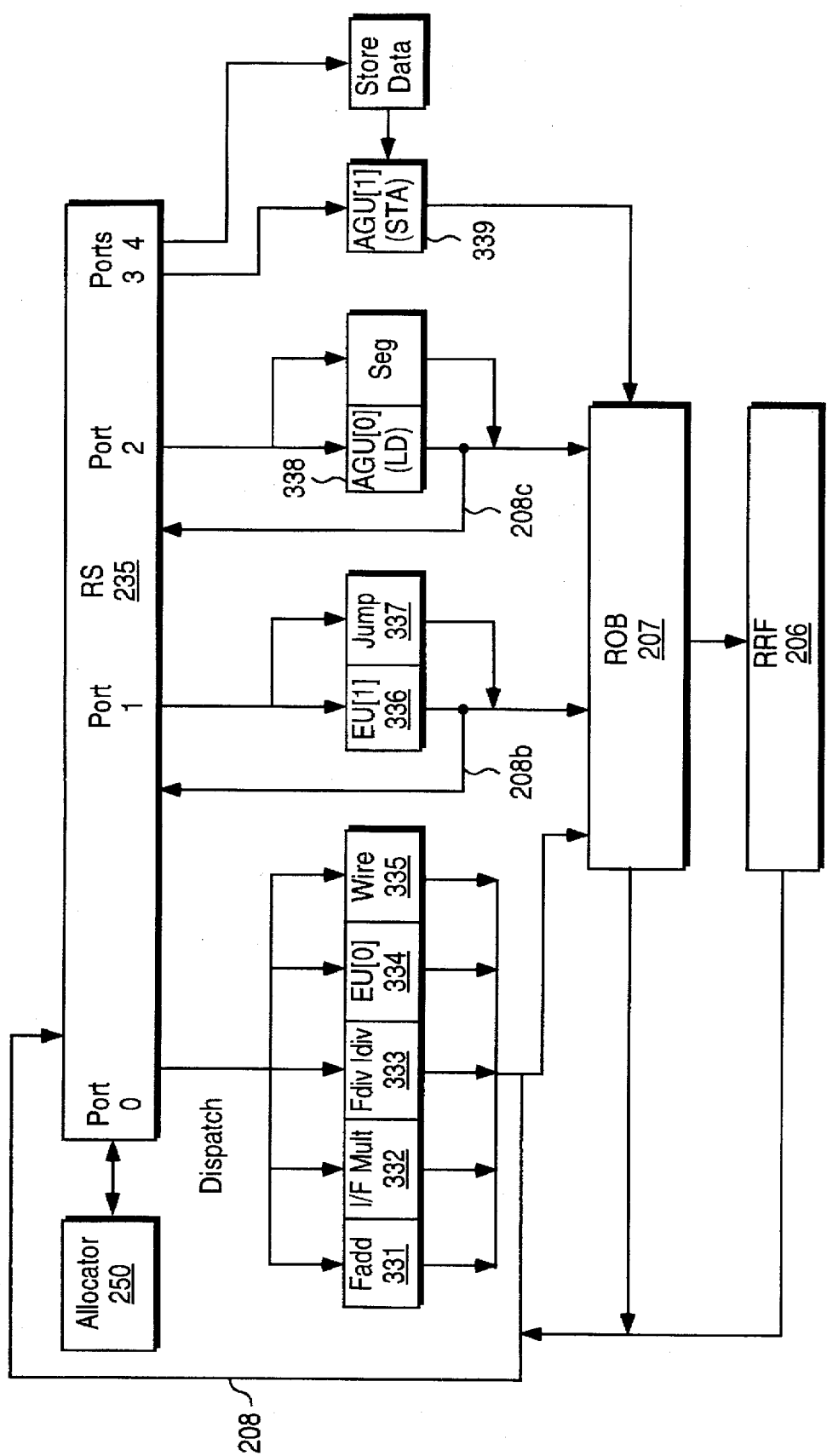
FIG. 3 illustrates a portion of a microprocessor such as may be used with one embodiment of the present invention.

FIG. 3 illustrates a portion of a microprocessor such as may be used with one embodiment of the present invention. The microprocessor implementing the preferred embodiment of the present invention utilizes out-of-order order execution of instructions. The portion of the microprocessor illustrated in FIG. 3 can be considered the out-of-order core of the microprocessor. The first element of the out-of-order core illustrated in FIG. 3 is the reservation station 235. The reservation station 235 is an SRAM register file in front of the functional units that buffers micro operations that are waiting for needed resources in order to execute. These needed resources include the source data operands (that previous micro operations may not yet have created) and a functional unit with which to execute the micro operation.

The reservation station 235 performs several functions. Its data fields serve as a temporary buffer for instructions and the source data that is or will be available. The reservation station 235 maintains waiting instructions and is "watching" the result/writeback bus 208 from all the execution interfaces "looking" for source data that it needs for its micro operations. When the watched-for data arrives on the writeback bus 208, the reservation station 235 writes it into the appropriate source data field.

Once all the source operands for a micro operation are in the reservation station 235, the reservation station 235 determines when an appropriate execution unit is available and schedules the data ready micro operation for dispatch. It is the identification of which port a micro operation is dispatched to which concerns the present invention.

The reservation station 235 of FIG. 3 is illustrated having five dispatch ports. Primarily, functional micro operations in the embodiment illustrated will be dispatched from either Dispatch Port 0 or Dispatch Port 1 and memory operations will be dispatched from Dispatch Ports 2–4. In a microprocessor such as may be used with one embodiment of the present invention, there are five execution units coupled to Dispatch Port 0 from reservation station 235. These are the floating point add unit 331, the multiply unit 332 for performing integer and floating point multiplies, integer and floating point divide unit 333, integer execution unit 334, and a wire unit 335. Micro operations, when they are dispatched from Dispatch Port 0 of the reservation station 235, are operated on by the various execution units 331–335.

Most applications heavily utilize the integer execution unit. Integer execution unit 334 is designed to be able to process data-ready micro operations in one clock cycle. It is therefore referred to as a single-cycle functional unit. In one embodiment, the integer execution unit 334 receives data having a width of 32 bits. The floating point execution units 331, 332 and 333 carry out more complicated tasks when they receive data-ready micro operations. These functional units receive input streams having a width for 86 bits of source data.

There is also a wire unit 335 which is a hybrid execution unit implemented in one embodiment for various other instructions. It is similar to a floating point unit in that its input stream takes sources that are 86 bits wide, but it is more like an integer execution unit in that it performs its operations in a single clock cycle.

After an execution unit executes a micro operation, it writes back the result to the reorder buffer 207 over writeback bus 208. At the same time that execution units write back to the reorder buffer 207, they simultaneously write back to the reservation station 235. It may be that the result of an execution unit's operation provides a source operand needed for the execution of another micro operation waiting in the reservation station.

Dispatch port 1 from reservation station 235 also has two execution units coupled to it. There is an integer execution unit 336 and a jump unit 337. After one of the execution units 336 or 337 executes a micro operation, it writes back the result to the reorder buffer 207 and also back to the reservation station 235 over writeback bus 208b.

The integer execution unit 336 may be identical to the execution unit 334, or it may have additional or different functionality. Two integer execution units are provided because of the high volume of integer micro operations common in most code, thereby enhancing performance of the overall system. Of course, alternative microprocessors may incorporate more or fewer integer execution units depending upon design objectives.

Coupled to the reservation station 235 through Dispatch Ports 2, 3 and 4 are the memory system execution units. The AGU[0] 338 calculates and processes memory address for loads. The load result is then provided to the ROB 207 and to the reservation station 235 through writeback bus 208c. Similarly, stores are propagated through Dispatch Ports 3 and 4 of the reservation station 235. The AGU[1] unit 339 calculates store addresses and propagates them through the memory system.

The focus of the present invention is the scheduling of the dispatch of operations waiting in a reservation station to an appropriate functional unit. The scheduling mechanism of the present invention may be incorporated in any out-of-order execution system utilizing one or more reservation stations for waiting micro operations. For purposes of illustration, the reservation station arrangement illustrated in FIG. 4 will be described as representative of this class of microprocessor implementation. In one embodiment of the present invention, the reservation station is implemented such that twenty (20) micro operations at one time may be waiting for all necessary resources required for dispatch to an execution unit.

Figure 4:
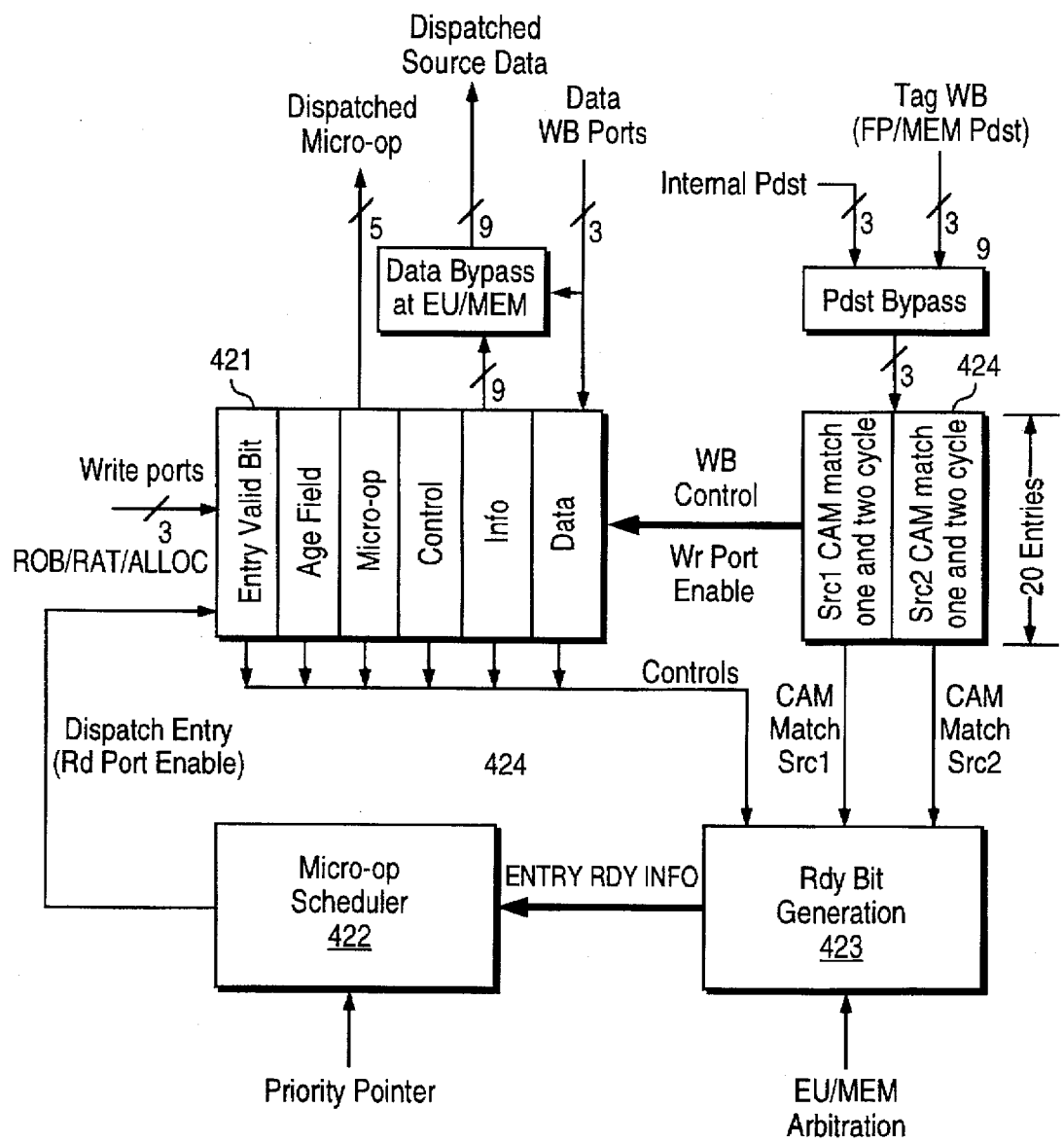
FIG. 4 shows a portion of an out-of-order execution system such as may be used with one embodiment of the present invention.

In FIG. 4, the micro operations and associated data are shown as an array 421. The content of information for a given micro operation includes the micro operation instruction, source operands, control bits indicating the validity of the source data as well as information indicating the Dispatch Port from which a given micro operation is to be dispatched. In one embodiment, the present invention has micro operations written into the reservation station with information indicating a particular Dispatch Port. This method is referred to as "statically" binding micro operations to specific Dispatch Ports.

Coupled to the reservation station array 421 is a micro operation scheduler 422. The micro operation scheduler 422 peruses the reservation station memory array 421 looking for data-ready micro operations to dispatch. A micro operation is ready when all valid source data has been determined by the reservation station and an appropriate functional unit is available when the micro operation is ready to be dispatched. Valid source data is determined either by receipt of the data or upon receiving information that the data will be ready in time for scheduling.

The micro operation scheduler 422 is informed of ready micro operations by receiving a signal from the ready bit generation logic 423. The ready bit generation logic 423 receives input signals that indicate the availability of functional units, the activation of valid bits for source data from the reservation station and any data forwarding information detected by the content addressable memory (CAM) logic 424 which performs tag matching for needed data being concurrently written back.

Figure 5:
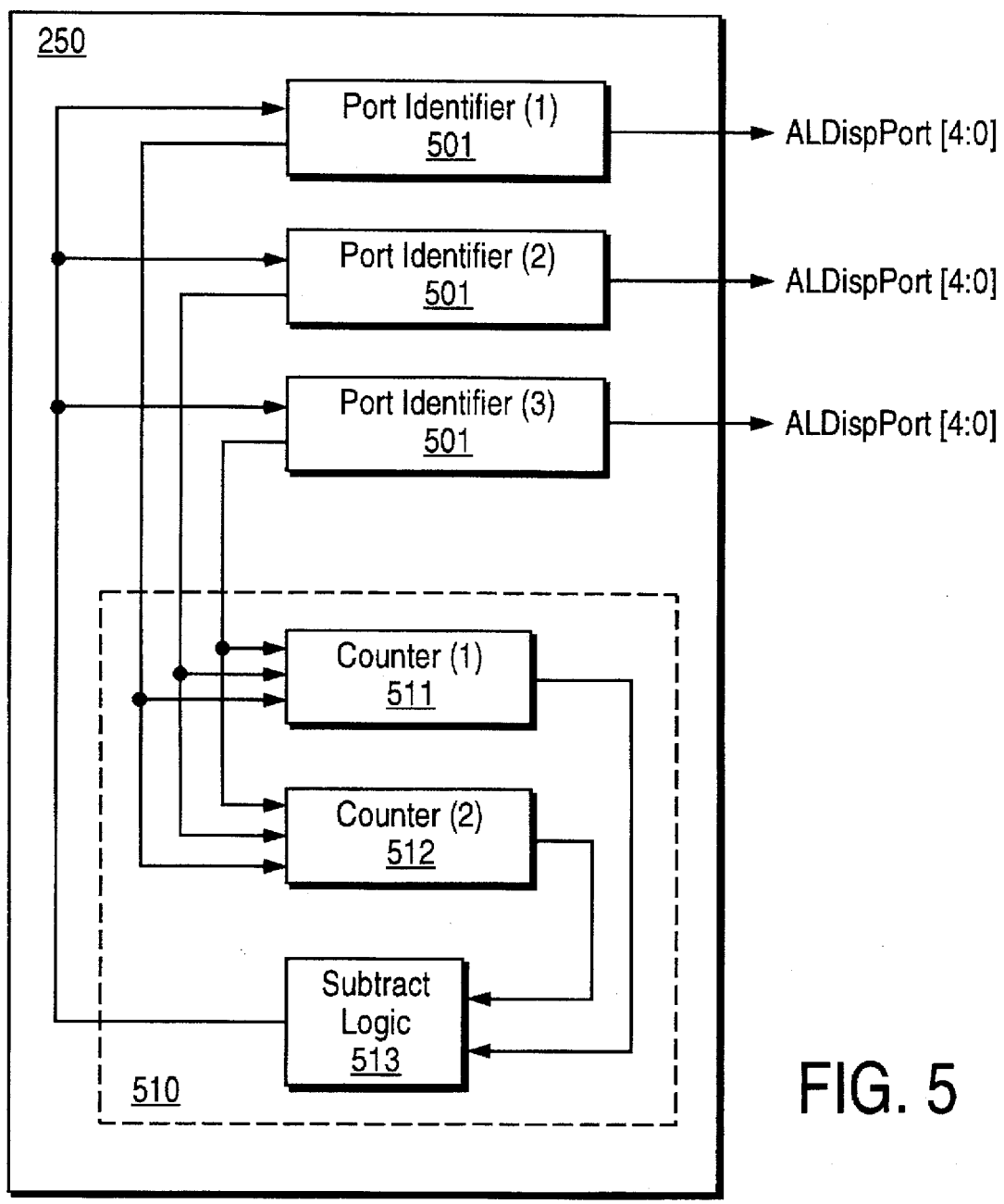
FIG. 5 is a block diagram showing an allocator according to one embodiment of the present invention.

FIG. 5 is a block diagram showing an allocator according to one embodiment of the present invention. The allocator 250 shown includes three port identifiers 501. A separate port identifier 501 corresponds to each of the micro operations which may be issued to allocator 250 per clock cycle. In one embodiment, allocator 250 can receive up to three micro operations per clock cycle. It is to be appreciated that allocator 250 may have different numbers of port identifiers, depending on the maximum number of micro operations which allocator 250 can receive per clock cycle.

Each of the port identifiers 501 indicates to the reservation station 235 from which of the Dispatch Ports its associated micro operation is to be dispatched. This is referred to as binding the micro operation to a Dispatch Port, or tagging the micro operation for a Dispatch Port. In one implementation, five ALDispPort signals are output from each of the port identifiers 501, indicating to which of the five Dispatch Ports the associated micro operation should be bound.

In some instances, only a single port exists from which the micro operation can be dispatched. For example, in the out-of-order core shown in FIG. 3, a floating point micro operation must be bound to Dispatch Port 0 because none of the Dispatch Ports 1-4 is connected to an execution unit which can perform floating point micro operations. In other instances, however, multiple ports exist from which the micro operation can be dispatched. For example, integer execution unit 334 is connected to Dispatch Port 0 and integer execution unit 336 is connected to Dispatch Port 1. Thus, a micro operation which requires an integer execution unit (for example, an integer addition micro operation) can be bound to either Dispatch Port 0 or Dispatch Port 1. Therefore, an issue arises as to which Dispatch Port a micro operation should be bound when the micro operation can be bound to multiple Dispatch Ports.

The present invention resolves this issue by using a counter mechanism 510. The counter mechanism 510 maintains a count of the number of micro operations which have been tagged for dispatch, but not yet dispatched from, particular Dispatch Ports. Therefore, the counter mechanism 510 maintains a pending count of micro operations which are in the reservation station 235 awaiting dispatch from a particular Dispatch Port. In one embodiment counter mechanism 510 maintains a count for only the Dispatch Ports corresponding to duplicate execution units. In the currently preferred embodiment, only Dispatch Port 0 and Dispatch Port 1 contain duplicate execution units (integer execution units 334 and 336, respectively).

Counter mechanism 510 includes a counter 511, a counter 512, and subtract logic 513. In one embodiment, counter 511 corresponds to Dispatch Port 0 and counter 512 corresponds to Dispatch Port 1. Counters 511 and 512 output their respective counts to subtract logic 513. Subtract logic 513 compares the two counts and outputs the difference between the two counts to the port identifiers 501. Based on this difference and the nature of the micro operation, a port identifier 501 identifies the Dispatch Port from which its corresponding micro operation is to be dispatched.

In one embodiment of the present invention, subtraction logic 513 determines the difference between the two counts by subtracting the count value of counter 512 from the count value of counter 511.

In one implementation, each of the counters 511 and 512 is a five-bit counter. However, it is to be appreciated that different sized counters can also be used with the present invention.

Figure 6:
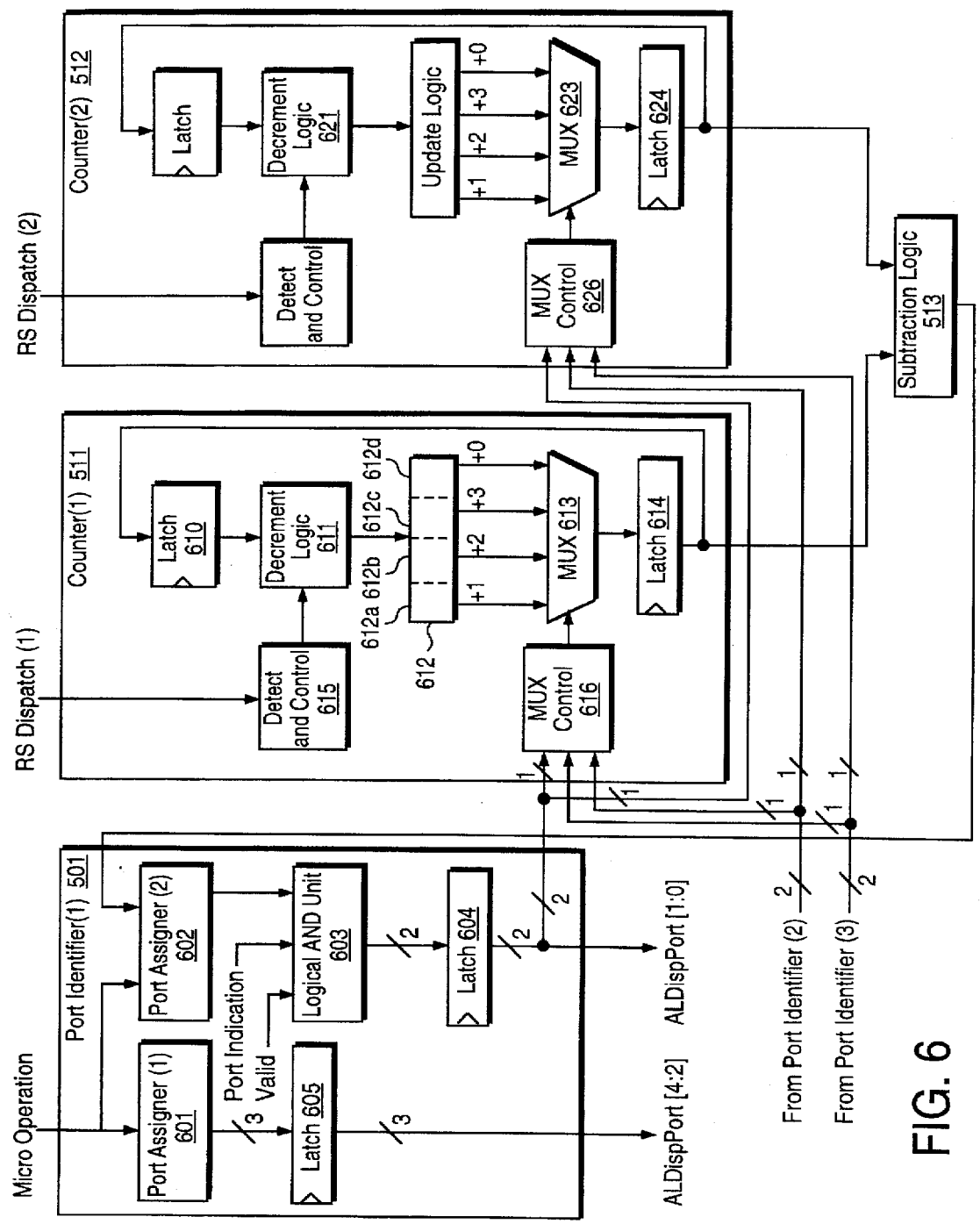
FIG. 6 is a block diagram showing a port identifier and a counter mechanism in more detail according to one embodiment of the present invention.

FIG. 6 is a block diagram showing a port identifier and a counter mechanism in more detail according to one embodiment of the present invention. A single port identifier 501 is shown coupled to counters 511 and 512, and also coupled to subtract logic 513. Only a single port identifier 501 is shown so as not to clutter the drawing. However, it is to be appreciated that multiple port identifiers 501 can be included within an allocator, as discussed above.

A micro operation is received by port identifier 501 and input to two port assignors, port assignor 601 and port assignor 602. Port assignor 601 identifies to which of the Dispatch Ports 2, 3 or 4 the micro operation is to be bound, if any. In one embodiment, port assignor 601 maintains a lookup table of micro operations to Dispatch Ports, based on the execution units coupled to the Dispatch Ports 2, 3 and 4. Thus, upon receipt of the micro operation, port assignor 601 can readily determine whether the micro operation is to be bound to one of the Dispatch Ports 2, 3 or 4. If the lookup by port assignor 601 identifies one of these three ports (Dispatch Port 2, 3 or 4), then the ALDispPort signal line corresponding to that Dispatch Port is asserted, thereby causing the reservation station to tag the micro operation for dispatch from the identified Dispatch Port. It should be noted, however, that a particular micro operation may not be dispatched over any of the Dispatch Ports 2, 3 and 4 (e.g., it may be dispatched over Dispatch Port 1 ), thereby causing none of the ALPDispPort signal lines to be asserted by port assignor 601.

Alternatively, the micro operation itself may include an identification of the proper Dispatch Port for the operation. For example, additional control bits may be added to the micro operation which identify one or more of the five possible dispatch ports. These additional control bits can be added, for example, by the instruction decode unit 221 of FIG. 2.

Port assignor 602 identifies which of Dispatch Ports 0 or 1 a micro operation is to be bound to if the micro operation could be dispatched from either Dispatch Port 0 or 1. Port assignor 602 compares the difference received from subtraction logic 513 to a comparison table and determines which of the Dispatch Ports 0 or 1 the micro operation is to be bound to based on this comparison, as well as whether the micro operation is the first, second or third micro operation of the set of three micro operations received by the allocator.

In one embodiment, the comparison table lookup used by port assignor 602 is shown in Table I. The comparison table lookup identifies which Dispatch Port of Dispatch Ports 0 and 1 each of the three micro operations are to be dispatched from, based on the difference between the counts for Dispatch Ports 0 and 1 (as identified by subtraction logic 513).

TABLE I

| Counter Difference | Micro operation 1 | Micro operation 2 | Micro operation 3 |
|---|---|---|---|
| 2 or greater | 0 | 0 | 0 |
| 1 | 0 | 0 | 1 |
| 0 | 1 | 0 | 1 |
| −1 | 1 | 0 | 1 |
| −2 or less | 1 | 1 | 1 |

It is to be appreciated that the values shown in Table I are meant as an example only, and that additional Dispatch Ports could be identified based on the counter difference. By way of additional example, an alternate embodiment is shown below in Table II.

TABLE II

| Counter Difference | Micro operation 1 | Micro operation 2 | Micro operation 3 |
|---|---|---|---|
| 2 or greater | 0 | 0 | 0 |
| 1 | 1 | 0 | 0 |
| 0 | 1 | 1 | 0 |
| −1 | 1 | 1 | 0 |
| −2 or less | 1 | 1 | 1 |

In one embodiment, the present invention presumes that many instructions received by the allocator are, as much as possible, ordered by a compiler such that consecutive instructions correspond to different execution units, and thus are to be dispatched from different Dispatch Ports. Thus, in this embodiment, the present invention presumes that it is better to have two consecutive micro operations dispatched from different Dispatch Ports, unless the difference in counts is fairly large.

Port assignor 602 outputs signals identifying one of the Dispatch Ports 0 or 1, as discussed above. These signals are then input to logical AND unit 603. Logical AND unit 603 also receives two additional inputs: a valid signal and port indication signals. The allocator 250 receives a separate valid signal associated with each of the micro operations it receives. This valid signal indicates whether its associated micro operation is valid or invalid. A micro operation may be invalid, for example, in situations where the instruction decoder cannot decode instructions fast enough, such as when the instruction decoder is only able to provide two operations. In this example, two micro operations are input as micro operation 1 and micro operation 2, and their corresponding valid signals are asserted. However, micro operation 3 (which can actually be a dummy micro operation) is received with its corresponding valid signal deasserted, thereby indicating that the micro operation is invalid.

The port indication signals are an additional input indicating from which of the Dispatch Ports 0 or 1 the associated micro operation can be dispatched. Note that the port indication signals could indicate Dispatch Port 0, Dispatch Port 1, either Dispatch Port 0 or 1, or neither Dispatch Port 0 nor 1. In one embodiment, the port indication signals are encoded in the micro operation itself. Thus, in this embodiment, port indication control signals from the micro operation are input to logical AND unit 603. In an alternate embodiment, port assignor 602 includes a lookup table of micro operations analogous to the lookup table discussed above with reference to port assignor 602. Thus, in this alternate embodiment, the port indication signals are received from port assignor 602.

Logical AND unit 603 combines these three inputs and provides an output identifying the Dispatch Port 0 or 1, or neither, to latch 604. The identifier for the Dispatch Port is then output from latch 604 as ALDispPort [1:0]. In one embodiment, logical AND unit 603 actually outputs two separate signals, corresponding to the ALDispPort[1] and ALDispPort[0] signals. In this embodiment, it is to be appreciated that latch 604 represents two separate latch devices, one corresponding to each of the ALDispPort[1:0] signals.

The output of the logical AND unit 603 is dependent on the three input signals, as shown in Table III below. In Table III, the valid signal input is either deasserted (corresponding to an invalid micro operation) or asserted (corresponding to a valid micro operation). The port indication signals indicate Dispatch Port 0 only, Dispatch Port 1 only, either Dispatch Port 0 or 1, or neither Dispatch Port 0 nor 1. The input signal from port assignor 602 indicates either a "0" (corresponding to Dispatch Port 0) or a "1" (corresponding to Dispatch Port 1). It is to be appreciated that Table III can be implemented in a conventional manner using conventional combinatorial logic.

TABLE III

| Valid Signal | Port Indication Signal | Port Identifier from port assignor 602 | Output (Dispatch Port) |
| --- | --- | --- | --- |
| deasserted | Neither port | Port 0 | Neither port |
| deasserted | Neither port | Port 1 | Neither port |
| deasserted | Port 0 only | Port 0 | Neither port |
| deasserted | Port 0 only | Port 1 | Neither port |
| deasserted | Port 1 only | Port 0 | Neither port |
| deasserted | Port 1 only | Port 1 | Neither port |
| deasserted | Either port | Port 0 | Neither port |
| deasserted | Either port | Port 1 | Neither port |
| asserted | Neither port | Port 0 | Neither port |
| asserted | Neither port | Port 1 | Neither port |
| asserted | Port 0 only | Port 0 | Dispatch Port 0 |
| asserted | Port 0 only | Port 1 | Dispatch Port 0 |
| asserted | Port 1 only | Port 0 | Dispatch Port 1 |
| asserted | Port 1 only | Port 1 | Dispatch Port 1 |
| asserted | Either port | Port 0 | Dispatch Port 0 |
| asserted | Either port | Port 1 | Dispatch Port 1 |

The Dispatch Port identifier from latch 604 is also input to counters 511 and 512. Counters 511 and 512 use this Dispatch Port identifier to update the count for the appropriate Dispatch Port when an instruction is identified as tagged to the Dispatch Port, as discussed in more detail below.

In an alternate embodiment of the present invention, port assignor 602 includes a lookup table of micro operations to Dispatch Ports. Thus, upon receipt of the micro operation, port assignor 602 can determine whether the micro operation is to be bound to one of the Dispatch Ports 0 or 1, neither Dispatch Port 0 nor 1, or either of the Dispatch Ports 0 and 1. Port assignor 602 performs the micro operation table lookup and the comparison table lookup concurrently. If the micro operation lookup table indicates that the micro operation can be dispatched from only one of Dispatch Ports 0 and 1, or to neither Dispatch Port 0 nor 1, then the result of the micro operation lookup table is output by port assignor 602. However, if the micro operation lookup table indicates that the micro operation can be dispatched from either Dispatch Port 0 or 1, then the result of the comparison table lookup is output by port assignor 602.

Counter 511 is shown including a latch 610, decrement logic 611, update logic 612, multiplexer 613, and latch 614. The count value of counter 511 propagates through these units, and may be changed by either decrement logic 611 or update logic 612 and multiplexer 613, as discussed below.

Decrement logic 611 decrements the value of the count by one each time a micro operation is dispatched from the Dispatch Port corresponding to counter 511. In one embodiment, decrement logic 611 is activated by detect and control logic 615, which receives a signal from the reservation station that a micro operation has been dispatched from the corresponding Dispatch Port. In one implementation, detect and control logic 615 also checks whether the value of counter 511 is zero when a micro operation is dispatched from the corresponding Dispatch Port. If the value of counter 511 is zero, then detect and control logic 615 does not activate decrement logic 611.

Update logic 612 comprises four different incrementors 612a, 612b, 612c, and 612d. Each of the incrementors 612a–612d outputs a different value based on the input count value it receives. The four values output by the incrementors 612a–612d are: the input count value plus 1, the input count value plus 2, the input count value plus 3, and the input count value, respectively. Which one of these four count values is actually used as the new count value for counter 511 is determined by multiplexer 613. The output count value from multiplexer 613 is then input to latch 614, which inputs the count value to latch 610, so that the count value can again be modified, if necessary, in the next clock cycle.

Multiplexer 613 is a 4 to 1 multiplexer which outputs one of four count values corresponding to the input count value incremented by zero, one, two or three. Multiplexer control 616 indicates which of the four count values is output by multiplexer 613 based on the inputs it receives from each of the port identifiers 501. The output signal from latch 604 of port identifier 501 indicates whether the micro operation is tagged for dispatch from Dispatch Port 0 or 1. Multiplexer control 616 indicates to multiplexer 613 that multiplexer 613 should output the count value which is the input count value incremented by zero, one, two or three if the number of micro operations tagged to the Dispatch Port corresponding to counter 511 as indicated by the port identifiers is zero, one, two or three, respectively.

Counter 512 operates analogous to counter 511 as discussed above, except that it corresponds to a different one of the Dispatch Ports. Thus, decrement logic 621 decrements the count value of counter 512 responsive to a micro operation being dispatched from a Dispatch Port which is different from the Dispatch Port which causes decrement logic 611 to decrement the count value of counter 511. Similarly, multiplexer control 626 causes multiplexer 623 to output the count value incremented by zero, one, two or three, if the number of micro operations tagged to the Dispatch Port corresponding to counter 612 as indicated by the port identifiers is zero, one, two or three, respectively.

In one embodiment of the present invention, the count values output from latches 614 and 624 are input to subtraction logic 513 each clock cycle. Subtraction logic 513 subtracts the count value from latch 624 from the count value from latch 614, thereby calculating the difference between the two count values. This difference is then input to port assignor 602 to be used to determine to which of multiple ports a micro operation should be tagged, as discussed above.

In one embodiment of the present invention, an additional latch and multiplexer (not shown) are coupled to each of the port identifiers 501 between the latch 604 and the output ALDispPort[1:0] signals. The additional latch allows the port identifiers 501 to maintain the previous values of the ALDispPort[1:0] signals. Both the newly generated values and the previous values of the ALDispPort[1:0] signals are input to the multiplexer, which in turn determines, based on an input control signal, whether the newly generated or previous values are output by the port identifiers 501. The maintenance of the previous values can be useful, for example, in situations where the microprocessor pipeline needs to be stalled.

In the descriptions above, an example of the use of the present invention is described in a system employing three port identifiers and two counters. It is to be appreciated that these descriptions are meant as an example only, and that different numbers of port identifiers and counters can be used within the spirit and scope of the present invention. In alternate embodiments, the number of port identifiers can be changed based on the maximum number of micro operations which the allocator can receive per clock cycle. In other alternate embodiments, a different counter can be employed for each Dispatch Port that includes an execution unit which is a duplicate of another execution unit. For example, three Dispatch Ports may be coupled to integer execution units, thereby resulting in the present invention maintaining three separate counters, one for each of the three Dispatch Ports.

In the descriptions above, the reservation station is discussed as dispatching micro operations from the Dispatch Ports. However, it is to be appreciated that the micro operations are simply a type of instruction which is dispatched by the reservation station, and that any of a wide type of instructions can be used with the present invention.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for binding instructions to dispatch ports of a reservation station has been described.

What is claimed is:

1. An apparatus for identifying a first dispatch port of a reservation station from which an instruction is to be dispatched, wherein the instruction could be dispatched from a plurality of dispatch ports of the reservation station, the apparatus comprising:
a counter mechanism to maintain a first count of instructions which are pending dispatch from the first dispatch port of the plurality of dispatch ports; and
a port identifier, coupled to the counter mechanism, to identify the first dispatch port based on the first count of instructions.

2. The apparatus of claim 1, wherein the port identifier includes:
a first port assignor to identify one dispatch port of a first set of the plurality of dispatch ports; and
a second port assignor to identify one dispatch port of a second set of the plurality of dispatch ports, wherein the second port assignor is coupled to the first port assignor and is also coupled to the counter mechanism, and wherein the second port assignor is to identify the one dispatch port of the second set in response to a signal from the counter mechanism.

3. The apparatus of claim 1, wherein the counter mechanism is also to maintain a second count of instructions which are pending dispatch from a second dispatch port of the reservation station, and wherein the port identifier is to identify the first dispatch port based on both the first count of instructions and the second count of instructions.

4. The apparatus of claim 3, wherein the counter mechanism includes:
a plurality of counters, wherein a first counter of the plurality of counters is to maintain the first count of instructions, and wherein a second counter of the plurality of counters is to maintain the second count of instructions; and
a subtraction logic unit to provide to the port identifier a difference between the first counter and the second counter.

5. The apparatus of claim 4, wherein the port identifier identifies the first dispatch port based on the difference between the first counter and the second counter.

6. An apparatus for binding an instruction to one of a plurality of dispatch ports in a reservation station, the apparatus comprising:
an allocator for receiving the instruction and, upon receipt of the instruction, for identifying a first dispatch port to the reservation station, wherein the identifying binds the instruction to the first dispatch port, and wherein the allocator includes a port identifier for identifying the first dispatch port, wherein the port identifier identifies the first dispatch port based on both the instruction and a count of instructions in the reservation station which are tagged for dispatch from the first dispatch port; and
wherein the reservation station is coupled to the allocator and wherein the reservation station is for buffering the instruction and also for dispatching the instruction to the first dispatch port.

7. The apparatus of claim 6, wherein the allocator includes:
a counter mechanism, coupled to the port identifier, for maintaining the count of instructions in the reservation station which are tagged for dispatch from the first dispatch port.

8. The apparatus of claim 7, wherein the port identifier includes:
a first port assignor for identifying one of a first set of the plurality of dispatch ports; and
a second port assignor for identifying one of a second set of the plurality of dispatch ports, wherein the second port assignor is coupled to the first port assignor and is also coupled to the counter mechanism, and wherein the second port assignor is for identifying the one dispatch port of the second set of the plurality of dispatch ports in response to the count of instructions.

9. The apparatus of claim 7, wherein the counter mechanism includes:
a plurality of counters, wherein a first counter of the plurality of counters maintains the count of instructions which are tagged for dispatch from the first dispatch port, and wherein a second counter of the plurality of counters maintains a count of instructions which are tagged for dispatch from a second dispatch port of the reservation station; and a subtraction logic unit for providing to the port identifier a difference between the first counter and the second counter of the plurality of counters.

10. An apparatus comprising:

a reservation station for buffering an instruction and also for dispatching the instruction from a first dispatch port of a plurality of dispatch ports, wherein the instruction could be dispatched from any one of the plurality of dispatch ports; and an allocator for receiving the instruction from an instruction decode unit, wherein the allocator is coupled to the reservation station, and wherein the allocator includes, a port identifier for identifying to the reservation station the first dispatch port based on a number of instructions pending dispatch from the first dispatch port.

11. The apparatus of claim 10, wherein the instruction could be dispatched from the first dispatch port or a second dispatch port of the plurality of dispatch ports, and wherein the port identifier is also for identifying the first dispatch port based on both the number of instructions pending dispatch from the first dispatch port and a number of instructions pending dispatch from the second dispatch port.

12. An apparatus for tagging an instruction for dispatch from one of a plurality of dispatch ports, the apparatus comprising:

a reservation station for buffering a plurality of instructions and also for dispatching the plurality of instructions from the plurality of dispatch ports; and an allocator for receiving the plurality of instructions concurrently from an instruction decode unit, wherein the allocator is coupled to the reservation station, and wherein the allocator includes, a plurality of port identifiers corresponding to the plurality of instructions, wherein the plurality of port identifiers, in response to the receipt of the plurality of instructions, identifies to the reservation station a set of the plurality of dispatch ports from which the plurality of instructions is to be dispatched based on a number of instructions which are pending dispatch over the set of the plurality of dispatch ports.

13. The apparatus of claim 12, wherein the set of the plurality of dispatch ports are coupled to identical execution units.

14. The apparatus of claim 13, wherein the identical execution units are integer execution units.

15. The apparatus of claim 12, wherein each of the plurality of instructions is a micro operation.

16. A computer system comprising:

a bus;

a memory device which stores an instruction, wherein the memory device is coupled to the bus; and one or more processors coupled to the bus, wherein each of the one or more processors includes, a plurality of execution units;

a reservation station for buffering a plurality of instructions, including the instruction, prior to dispatch to the plurality of execution units and also for dispatching the instruction to an execution unit of the plurality of execution units from a first dispatch port of a plurality of dispatch ports, and an allocator for receiving the instruction from the memory device and, upon receipt of the instruction, for identifying the first dispatch port to the reservation station, wherein the allocator includes a port identifier for identifying the first dispatch port, wherein the port identifier is for identifying the first dispatch port based on both the instruction and a count of instructions in the reservation station which are pending dispatch from the first dispatch port.

17. The system of claim 16, wherein the allocator includes:

a counter mechanism, coupled to the port identifier, for maintaining the count of instructions which are pending in the reservation station for dispatch from the first dispatch port.

18. A method for identifying a first dispatch port of a reservation station from which an instruction is to be dispatched, wherein the instruction could be dispatched from a plurality of dispatch ports of the reservation station, the method comprising the steps of:

(a) receiving the instruction;

(b) determining a number of instructions which are pending dispatch from at least one of the plurality of dispatch ports; and (c) identifying the first dispatch port based on the number of instructions which are pending dispatch from the at least one of the plurality of dispatch ports.

19. The method of claim 18, wherein the identifying step (c) comprises the steps of:

determining a difference between a number of instructions pending dispatch from the first dispatch port and a number of instructions pending dispatch from a second dispatch port; and identifying the first dispatch port based on the difference.

20. An apparatus for identifying a first dispatch port of a plurality of dispatch ports of a reservation station from which an instruction is to be dispatched, wherein the instruction could be dispatched from any one of the plurality of dispatch ports, the apparatus comprising:

means for maintaining a first count of instructions which are pending dispatch from the first dispatch port and a second count of instructions which are pending dispatch from a second dispatch port of the plurality of dispatch ports; and means, coupled to the means for maintaining, for identifying the first dispatch port based on both the first count of instructions and the second count of instructions.

21. The apparatus of claim 20, wherein the means for identifying includes:

means for identifying one dispatch port of a first set of the plurality of dispatch ports; and means for identifying one dispatch port of a second set of the plurality of dispatch ports, wherein the means for identifying one dispatch port of the second set is coupled to the means for identifying one dispatch port of the first set and is also coupled to the means for maintaining, and wherein the means for identifying one dispatch port of the second set is for identifying the one dispatch port of the second set in response to the means for maintaining.

22. The apparatus of claim 20, wherein the means for maintaining includes:

a plurality of counting means, wherein a first counting means of the plurality of counting means maintains the first count of instructions, and wherein a second counting means of the plurality of counting means maintains the second count of instructions; and a means for providing to the means for receiving and identifying a difference between the first counting means and the second counting means.

* * * * *

UNITED STATES PATENT AND TRADEMARK OFFICE
CERTIFICATE OF CORRECTION

PATENT NO. : 5,689,674
DATED : November 18, 1997
INVENTOR(S) : Griffith et al.

It is certified that error appears in the above-identified patent and that said Letters Patent is hereby corrected as shown below:

In column 7 at line 44 delete "yon" and insert --von--

Signed and Sealed this

Third Day of March, 1998

Attest:

BRUCE LEHMAN

*Attesting Officer*  *Commissioner of Patents and Trademarks*